US010249002B2

(12) United States Patent
Dintenfass et al.

(10) Patent No.: US 10,249,002 B2
(45) Date of Patent: Apr. 2, 2019

(54) SYSTEM FOR DYNAMIC VISUALIZATION OF INDIVIDUALIZED CONSUMPTION ACROSS SHARED RESOURCE ALLOCATION STRUCTURE

(71) Applicant: Bank of America Corporation, Charlotte, NC (US)

(72) Inventors: Katherine Dintenfass, Charlotte, NC (US); Damon C. Missouri, Trenton, NJ (US); Cameron Darnell Wadley, Waxhaw, NV (US); Alexander C. Wittkowski, Charlotte, NC (US); Alicia C. Jones-McFadden, Fort Mills, SC (US); Angela Fritz Thompson, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 495 days.

(21) Appl. No.: 14/851,848

(22) Filed: Sep. 11, 2015

(65) Prior Publication Data

US 2017/0076380 A1 Mar. 16, 2017

(51) Int. Cl.
*G06Q 40/06* (2012.01)
*H04L 29/08* (2006.01)

(52) U.S. Cl.
CPC .............. *G06Q 40/06* (2013.01); *H04L 67/14* (2013.01); *H04L 67/2804* (2013.01); *H04L 67/306* (2013.01)

(58) Field of Classification Search
CPC .................................................. G06Q 40/06
See application file for complete search history.

(56) References Cited

U.S. PATENT DOCUMENTS

| 5,930,764 A | 7/1999 | Melchione et al. |
| 5,983,205 A | 11/1999 | Brams et al. |
| 6,009,415 A | 12/1999 | Shurling et al. |
| 6,012,035 A | 1/2000 | Freeman, Jr. et al. |
| 6,073,110 A | 6/2000 | Rhodes et al. |
| 6,088,686 A | 7/2000 | Walker et al. |

(Continued)

FOREIGN PATENT DOCUMENTS

| KR | 20000049315 A | * | 8/2000 |
| WO | WO 2012/164487 | | 12/2012 |

OTHER PUBLICATIONS

Disclosed Anonymously, "System and method of socially monitoring and sharing purchase history of consumers", Feb. 5, 2013, 1-3 (Year: 2013).*

(Continued)

*Primary Examiner* — Bennett M Sigmond
*Assistant Examiner* — Dario Bianco
(74) *Attorney, Agent, or Firm* — Michael A. Springs; Moore & Van Allen PLLC; Peter B. Stewart

(57) ABSTRACT

Embodiments of the invention are directed to systems, methods, and computer program products for implementing and visualizing individualized consumption across a shared resource allocation structure. Example embodiments include categorizing transactions associated with individual users associated with the shared resource allocation structure and implementing individuals display and viewing of such transactions, including visualization of a relationship between one or more transactions and a set of transaction rules.

20 Claims, 2 Drawing Sheets

(56) References Cited

U.S. PATENT DOCUMENTS

| | | |
|---|---|---|
| 6,324,516 B1 | 11/2001 | Shults et al. |
| 6,415,267 B1 | 7/2002 | Hagan |
| 6,513,018 B1 | 1/2003 | Culhane |
| 6,826,536 B1 | 11/2004 | Forman |
| 6,901,406 B2 | 5/2005 | Nabe et al. |
| 6,934,692 B1 | 8/2005 | Duncan |
| 6,938,013 B1 | 8/2005 | Gutierrez-Sheris |
| 7,155,411 B1 | 12/2006 | Blinn et al. |
| 7,340,401 B1 | 3/2008 | Koenig et al. |
| 7,356,516 B2 | 4/2008 | Richey et al. |
| 7,395,219 B2 | 7/2008 | Strech |
| 7,401,040 B2 | 7/2008 | Sloan et al. |
| 7,421,408 B2 | 9/2008 | Ryder |
| 7,454,376 B1 | 11/2008 | Argenbright |
| 7,454,379 B1 | 11/2008 | Wolzenslci et al. |
| 7,467,094 B2 | 12/2008 | Rosenfeld et al. |
| 7,475,032 B1 | 1/2009 | Patnode et al. |
| 7,490,059 B2 | 2/2009 | Albee et al. |
| 7,542,921 B1 | 6/2009 | Hildreth |
| 7,580,877 B1 | 8/2009 | Argenbright |
| 7,627,512 B2 | 12/2009 | Harris et al. |
| 7,657,441 B2 | 2/2010 | Richey et al. |
| 7,720,754 B1 | 5/2010 | Gutierrez-Sheris |
| 7,783,545 B2 | 8/2010 | Sloan et al. |
| 7,783,566 B2 | 8/2010 | Armes et al. |
| 7,805,363 B2 | 9/2010 | Haggerty et al. |
| 7,809,625 B1 | 10/2010 | Thermond et al. |
| 7,844,523 B2 | 11/2010 | Torre et al. |
| 7,848,939 B1 | 12/2010 | Martin |
| 7,856,361 B1 | 12/2010 | Bell |
| 7,873,566 B1 | 1/2011 | Templeton et al. |
| 7,890,397 B1 | 2/2011 | Pena |
| 7,899,750 B1 | 3/2011 | Klieman et al. |
| 7,904,362 B1 | 3/2011 | Smith |
| 7,921,048 B2 | 4/2011 | Sloan et al. |
| 7,930,195 B2 | 4/2011 | Heyns et al. |
| 7,937,305 B1 | 5/2011 | Lego et al. |
| 7,987,101 B2 | 7/2011 | Cina et al. |
| 8,024,213 B1 | 9/2011 | Fano et al. |
| 8,032,932 B2 | 10/2011 | Speyer et al. |
| 8,069,103 B1 | 11/2011 | Davis |
| 8,121,947 B1 | 2/2012 | Barth et al. |
| 8,171,531 B2 | 5/2012 | Buer |
| 8,190,502 B2 | 5/2012 | Moran et al. |
| 8,204,834 B2 | 6/2012 | Racanelli et al. |
| 8,214,276 B1 | 7/2012 | Preece et al. |
| 8,234,194 B2 | 7/2012 | Mele et al. |
| 8,239,223 B1 | 8/2012 | Martin |
| 8,249,985 B2 | 8/2012 | Giordano et al. |
| 8,255,316 B2 | 8/2012 | Bal et al. |
| 8,271,364 B2 | 9/2012 | Nobili et al. |
| 8,301,469 B1 | 10/2012 | Veldhuizen et al. |
| 8,301,501 B1 | 10/2012 | Glaeser et al. |
| 8,327,428 B2 | 12/2012 | Bailey et al. |
| 8,346,666 B2 | 1/2013 | Lindelsee et al. |
| 8,370,243 B1 | 2/2013 | Cernyar |
| 8,380,544 B1 | 2/2013 | Hopkins, III |
| 8,407,142 B1 | 3/2013 | Griggs |
| 8,429,050 B2 | 4/2013 | Willard et al. |
| 8,447,692 B2 | 5/2013 | Thomas et al. |
| 8,473,410 B1 | 6/2013 | Haggerty et al. |
| 8,474,028 B2 | 6/2013 | Kulkarni et al. |
| 8,498,940 B2 | 7/2013 | Pelegero et al. |
| 8,527,382 B2 | 9/2013 | McDonough et al. |
| 8,538,875 B2 | 9/2013 | Seib et al. |
| 8,572,689 B2 | 10/2013 | Raclhakrishnan |
| 8,590,008 B1 | 11/2013 | Ellmore |
| 8,595,812 B2 | 11/2013 | Bomar et al. |
| 8,666,836 B2 | 3/2014 | Adams |
| 8,682,753 B2 | 3/2014 | Kulathungam |
| 8,731,583 B2 | 5/2014 | Wengrovitz |
| 8,732,004 B1 | 5/2014 | Ramos et al. |
| 8,751,346 B2 | 6/2014 | Maisonneuve |
| 8,768,736 B1 | 7/2014 | Chapman et al. |
| 8,788,429 B2 | 7/2014 | Tieken |
| 8,789,162 B2 | 7/2014 | Radhaktishnan |
| 8,833,639 B1 | 9/2014 | Hopkins, III |
| 8,839,383 B2 | 9/2014 | Van Horn |
| 8,903,739 B1 | 12/2014 | Janiczek |
| 8,918,306 B2 | 12/2014 | Cashman et al. |
| 8,930,253 B1 | 1/2015 | Ball |
| 8,943,574 B2 | 1/2015 | Bailey et al. |
| 8,953,789 B2 | 2/2015 | Arnold |
| 9,055,053 B2 | 6/2015 | Raclhakrishnan |
| 9,064,284 B1 | 6/2015 | Janiszeski et al. |
| 9,069,943 B2 | 6/2015 | Radhakrishnan et al. |
| 9,818,118 B2 * | 11/2017 | Barrett ............ G06Q 20/4037 |
| 2002/0049670 A1 | 4/2002 | Moritsu et al. |
| 2002/0077867 A1 | 6/2002 | Gittins et al. |
| 2002/0111946 A1 | 8/2002 | Fallon |
| 2002/0120846 A1 | 8/2002 | Stewart et al. |
| 2002/0147669 A1 | 10/2002 | Taylor et al. |
| 2002/0178100 A1 | 11/2002 | Koveos |
| 2003/0033227 A1 | 2/2003 | Heiser |
| 2003/0130873 A1 | 7/2003 | Nevin et al. |
| 2003/0225690 A1 | 12/2003 | Eaton |
| 2003/0233292 A1 | 12/2003 | Richey et al. |
| 2004/0078321 A1 | 4/2004 | Lawrence |
| 2004/0153382 A1 | 8/2004 | Boccuzzi et al. |
| 2005/0027544 A1 | 2/2005 | Newstead et al. |
| 2005/0044017 A1 | 2/2005 | Foss, Jr. et al. |
| 2005/0044028 A1 | 2/2005 | Torres |
| 2005/0055275 A1 | 3/2005 | Newman et al. |
| 2005/0267827 A1 | 12/2005 | Grant, Jr. et al. |
| 2005/0288941 A1 | 12/2005 | DuBois et al. |
| 2006/0074788 A1 | 4/2006 | Grizack et al. |
| 2007/0192143 A1 | 8/2007 | Krishnan et al. |
| 2007/0219875 A1 | 9/2007 | Toulotte |
| 2008/0046349 A1 | 2/2008 | Elberg et al. |
| 2008/0059351 A1 | 3/2008 | Richey et al. |
| 2008/0071556 A1 | 3/2008 | Cina et al. |
| 2009/0083638 A1 | 3/2009 | Gupta |
| 2010/0063908 A1 | 3/2010 | Racanelli et al. |
| 2010/0138359 A1 | 6/2010 | Alter |
| 2010/0153224 A1 * | 6/2010 | Livnat ............ G06O 10/10 705/21 |
| 2010/0161467 A1 | 6/2010 | Ageenko et al. |
| 2010/0161600 A1 | 6/2010 | Higgins et al. |
| 2010/0268645 A1 | 10/2010 | Martino et al. |
| 2011/0040581 A1 | 2/2011 | Wirth |
| 2011/0238553 A1 | 9/2011 | Raj et al. |
| 2012/0016817 A1 | 1/2012 | Smith et al. |
| 2012/0053987 A1 | 3/2012 | Satyavolu et al. |
| 2012/0101852 A1 | 4/2012 | Albert |
| 2012/0197794 A1 * | 8/2012 | Grigg ............ G06Q 20/105 705/41 |
| 2012/0209749 A1 | 8/2012 | Hammad et al. |
| 2012/0278216 A1 | 11/2012 | Evans et al. |
| 2012/0284201 A1 | 11/2012 | Racanelli et al. |
| 2013/0046661 A1 * | 2/2013 | Levin ............ G06Q 40/02 705/30 |
| 2013/0060617 A1 | 3/2013 | Ross et al. |
| 2013/0066754 A1 | 3/2013 | Atwood |
| 2013/0103771 A1 | 4/2013 | Lv |
| 2013/0159132 A1 | 6/2013 | Adams |
| 2013/0173467 A1 * | 7/2013 | Nuzzi ............ G06Q 20/3224 705/44 |
| 2013/0290198 A1 | 10/2013 | Vassil |
| 2014/0081816 A1 | 3/2014 | Kuznetsov |
| 2014/0081885 A1 | 3/2014 | Maxwell, II |
| 2014/0101060 A1 | 4/2014 | Calman et al. |
| 2014/0115064 A1 | 4/2014 | Calman et al. |
| 2014/0143076 A1 | 5/2014 | Gangi |
| 2014/0164287 A1 | 6/2014 | Hyde et al. |
| 2014/0310142 A1 | 10/2014 | Mak |
| 2014/0330691 A1 | 11/2014 | Samano Palacios |
| 2014/0379272 A1 | 12/2014 | Sathe |
| 2015/0073959 A1 * | 3/2015 | Connors ............ G06Q 40/00 705/35 |
| 2015/0081405 A1 | 3/2015 | Ross et al. |
| 2015/0135108 A1 | 5/2015 | Pope |
| 2015/0199679 A1 | 7/2015 | Palanisamy et al. |
| 2015/0206055 A1 | 7/2015 | Sengupta et al. |

(56) References Cited

U.S. PATENT DOCUMENTS

2015/0317635 A1 11/2015 Karamchedu et al.
2016/0379298 A1 12/2016 Isaacson et al.
2017/0076283 A1 3/2017 Dintenfass et al.

OTHER PUBLICATIONS

European Patent Office, "Notice from the European Patent Office dated Oct. 1, 2007 concerning business methods" Official Journal EPO, dated Nov. 2007, p. 592.

Jordan, Arthur, "Database Marketing Builds in Relationships with Members," Credit Union News (May 5, 1995), vol. 15, Issue 9, retrieved from the internet on May 8, 2012, 2 pages.

"Putting Customer Benefit First—to Provide Faster ROA-SAS Institute's Data Warehousing Practice Solves Business Problems", Copyright Business Wire, May 19, 1998, retrieved from the internet on May 8, 2012, 3 pages.

Synder, Daniel, "From List Fatigue to Relationship Marketing: The Credit Card industry Reassesses Its Direct Mail Strategies", Credit World, (Nov./Dec. 1997), pp. 27-30.

Quicken Willmaker Plus Estate Planning Essentials, Nolo, Sep. 2007.

* cited by examiner

SYSTEM FOR DYNAMIC VISUALIZATION OF INDIVIDUALIZED CONSUMPTION ACROSS SHARED RESOURCE ALLOCATION STRUCTURE

BACKGROUND

Many couples take advantage of the efficiencies and conveniences that can be derived from sharing resources and otherwise using shared resource allocation structures. However, despite the difficulties inherent in determining whether individual resource consumption within a shared resource allocation structure is consistent with rules or goals held in common among the couple, the technology associated with such resource allocation is still a limited area.

BRIEF SUMMARY

Embodiments of the present invention address the above needs and/or achieve other advantages by providing apparatuses (e.g., a system, computer program product, and/or other device) and methods for a system that enables a pair of individual users to visualize individualized consumption across a shared resource allocation structure. For example, in situations where a couple uses a joint checking account as a shared resource allocation structure, embodiments of the present invention allow for identification of individual consumption activities, establish transaction rules based on commonalities between the individual users, and visualize how one or more transactions conform to the transaction rules.

Embodiments of the invention comprise systems, computer program products, and methods for implementing and visualizing individualized consumption across a shared resource allocation structure. These embodiments comprise receiving a set of transaction information associated with the shared resource allocation structure, wherein the transaction information comprises data extracted from a plurality of consumption transactions; associating a first subset of transaction information with a first user; and associating a second subset of transaction information with a second user, wherein the second subset of transaction information is mutually exclusive from the first subset of transaction information.

Some example implementations further comprise associating a third subset of transaction information with the first user and with the second user, wherein the third subset of transaction information is mutually exclusive from the first subset of transaction information and is mutually exclusive from the second subset of transaction information.

Some such example implementations and other example implementations further comprise receiving from the first user a first plurality of responses to questions, wherein the first plurality of answers is associated with a first plurality of financial goals of the first user; and receiving from the second user a second plurality of responses to questions, wherein the second plurality of answer is associated with a second plurality of financial goals of the second user.

Some example implementations of the foregoing further comprise identifying an area of commonality between the plurality of financial goals of the first user and the plurality of financial goals of the second user; presenting to the first user a first depiction of the area of commonality; presenting to the second user a second depiction of the area of commonality; and establishing a transaction rule associated with the commonality.

Some example implementations contemplate comparing one or more transactions against a transaction rule. Some such example implementations comprise determining whether a consumption transaction in the first subset of transaction information is inconsistent with the transaction rule; determining whether a consumption transaction in the second subset of transaction information is inconsistent with the transaction rule; presenting to the first user a first depiction of the consumption transaction in the first subset of transaction information that is inconsistent with the transaction rule; and presenting to the second user a depiction of the consumption transaction in the second subset of transaction information that is inconsistent with the transaction rule.

Some example implementations contemplate challenging either or both users to engage in transactions that conform to a transaction rule and/or avoid transactions that tend to violate a transaction rule. Some such example implementations comprise transmitting to the first user a challenge associated with the consumption transaction in the first subset of transaction information that violates the rule; and transmitting to the second user a challenge associated with the consumption transaction in the second subset of transaction information that violates the rule.

Some further example implementations contemplate the use of communication amongst the users and with a third party to, for example, provide guidance regarding transaction rules, consumption activities, and other aspect of the shared resource allocation structure. Some such example implementations comprise establishing a first communication channel between a user device associated with the first user and a communication device associated with a third-party; establishing a second communication channel between a user device associated with the second user and a communication device associated with the third party; and establishing a third communication channel between the communication device associated with the first user, the communication device associated with the second user, and the communication device associated with the third-party.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
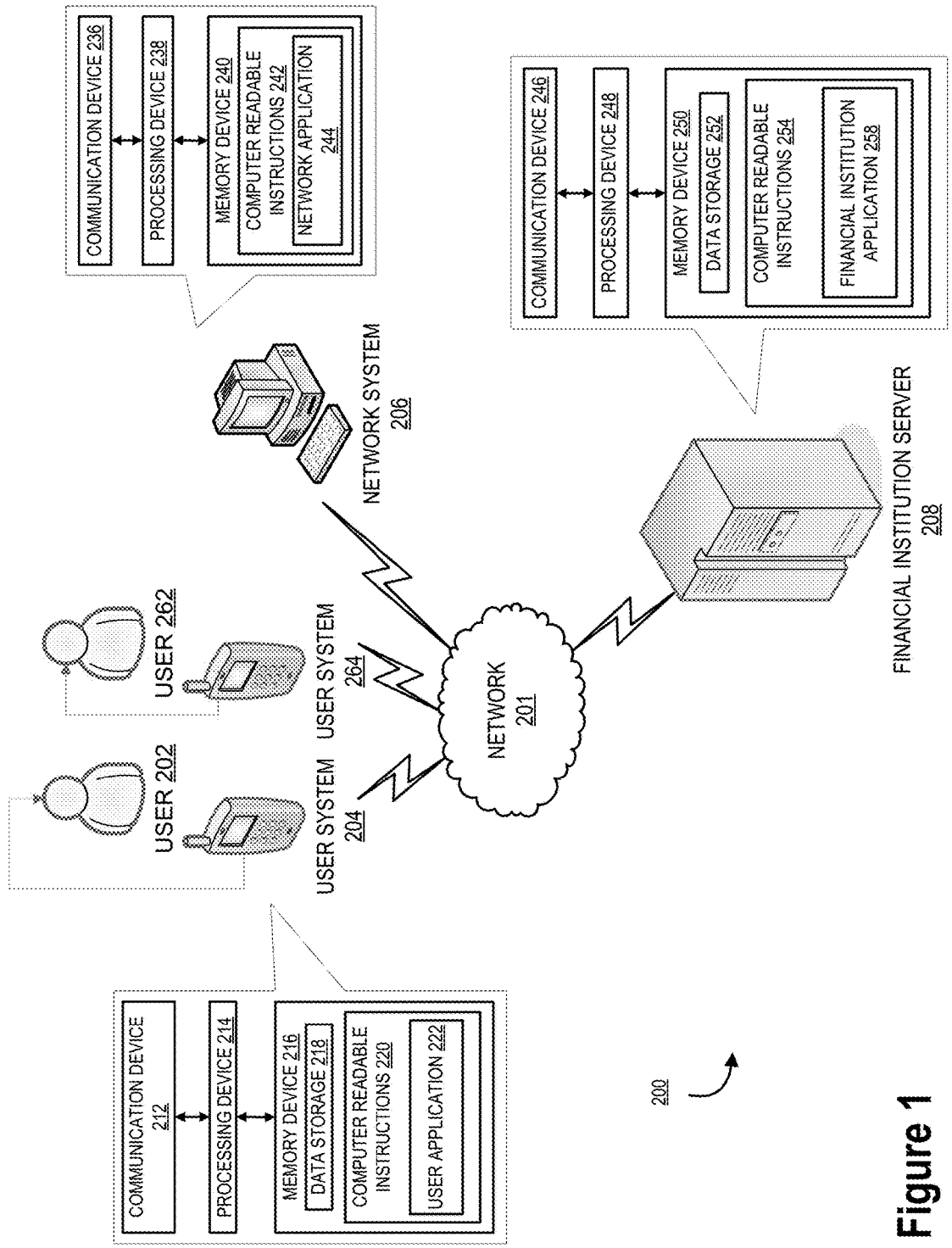
Figure 2:
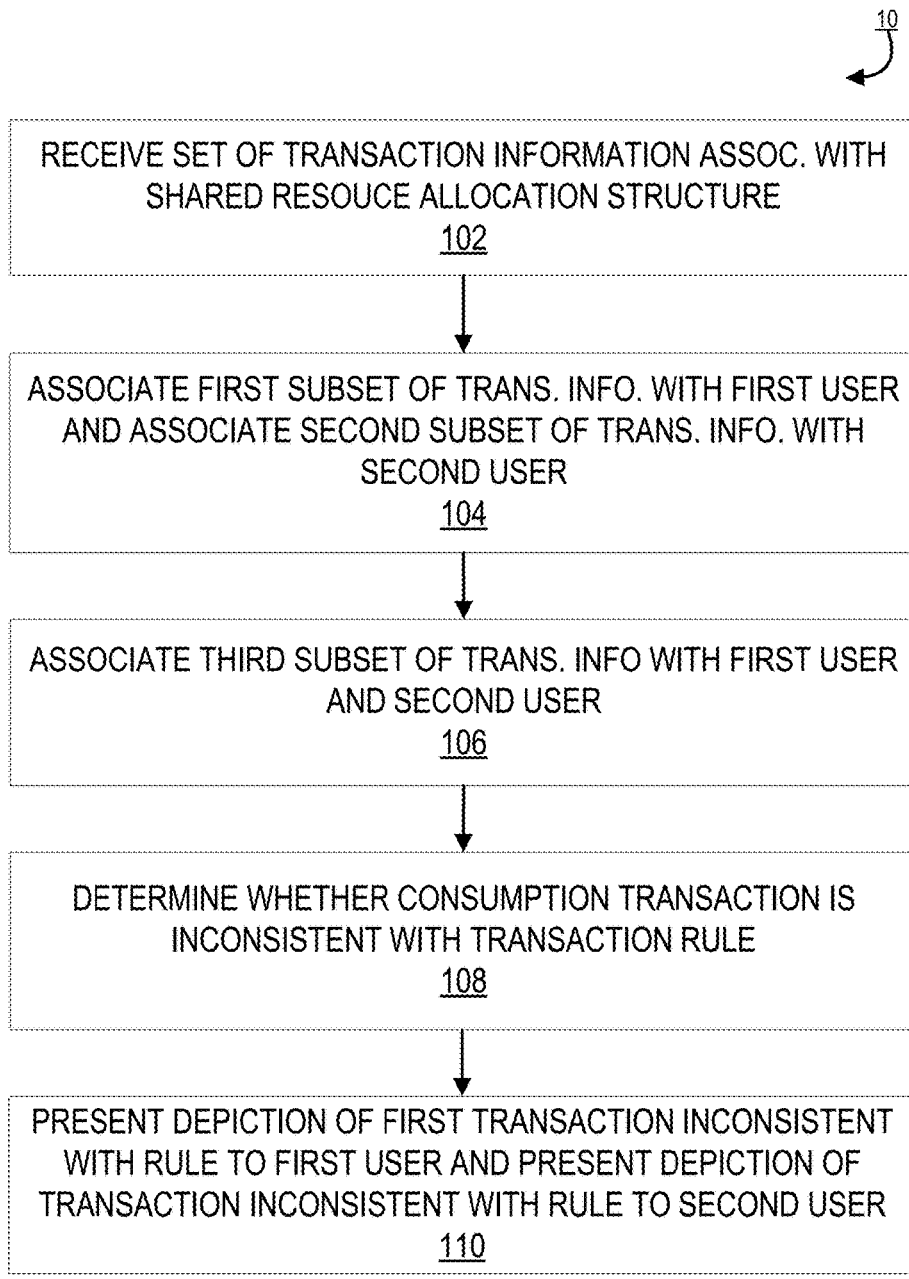

Having thus described embodiments of the invention in general terms, reference will be made to the accompanying drawings, where:

FIG. 1 presents a block diagram of the shared resource allocation structure visualization system environment for implementing the process flows described herein, in accordance with embodiments of the present invention;

FIG. 2 illustrates a process flow for implementing aspects of a shared resource allocation structure in accordance with embodiments of the present invention.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention, the financial institution described herein may be replaced with other types of businesses that may be associated with a shared resource allocation structure.

Some portions of this disclosure are written in terms of a financial institution's unique position with respect to user transactions. As such, a financial institution may be able to utilize its unique position to monitor and identify transactions for products or with merchants that utilize financial institution accounts to complete the transactions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with implementation and modification of shared resource allocation structures.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

As used herein, the term "shared resource allocation structure" refers to any store or allocation of resources that is jointly held by two or more individuals. A paradigmatic shared resource allocation structure is a shared checking account that is jointly held by the members of a married couple. Those skilled in the art will appreciate that any account or other resource that is jointly held by a two or more people, such as a joint savings account, joint retirement account, joint money-market account, or other joint resource can be a shared resource allocation structure.

Embodiments of the present invention are directed toward implementing aspects of shared resource allocation structures and the visualization of activity related thereto. Historically, many couples have taken advantage of the efficiencies and conveniences that can be realized through the use of a shared resource allocation structure. For example, where a couple pools some or all of its funds in such a structure, it can be easier for either member of the couple to engage in transactions that benefit the couple, such as purchasing groceries or other goods and services, paying bills, directing funds to investments, and other activities. However, because at least two people have access to the shared resource allocation structure, it can be difficult for an individual to track and understand all of the activity associated with the structure, particularly when both members of the couple actively use and consume shared resources. In particular, when there are incongruities between the financial goals of the respective members of a couple, or when one or both members of a couple engage in consumption transactions that are inconsistent with the financial goals of the other member of the couple, conflict can arise.

In an example illustration of an embodiment of the invention claimed and otherwise described herein, a joint checking account is held in common by two spouses. Both spouses use the joint checking account to pay for any of a number of goods and services. In this example, one spouse uses the joint checking account to pay for some of the couple's recurring transactions (such as a rent payment or a mortgage payment, utility bills, etc.), while the other spouse uses the joint checking account to pay for other costs incurred by the couple (such as periodic home maintenance, groceries, refueling a vehicle, etc.). In addition to using the joint checking account to pay for goods and services that are closely associated with the joint needs of the couple (such as shelter, food, transportation, etc.), one or both of the spouses use the joint checking account to pay for goods and services that are more closely associated with individual needs or interests (such as equipment related to one spouse's hobby, particular clothing items, or services used by one spouse but not the other). The high volume of transaction activity in the account can make it difficult for the couple to fully understand how the couple is using the joint checking account and to ascertain whether the financial activities that the couple is engaged in with respect to the joint checking account are consistent with the goals of the couple.

To assist the couple in understanding and evaluating their financial activities with respect to the joint checking account, the members of the couple each use a specialized application on their mobile device to access information about the joint checking account. On the first spouse's mobile device, the first spouse is shown a display of a set of transactions associated with the first spouse, such as lunches bought by the spouse at work, equipment for the spouse's hobby, and services used by the first spouse. On the second spouse's mobile device, the second spouse is shown a display of a set of transactions associated with the second spouse, such as services used by the second spouse, specialized clothing associated with the second spouse's job or hobby, and breakfasts bought by the second spouse before work. Both spouses may also be shown a display of a set of transactions that are associated with both of the spouses, such as housing costs, groceries, and utility bills. Those skilled in the art will appreciate that the individual spouses may be able to configure the transactions shown to them, and any information associated with those transactions, in accordance with the individuals spouse's preference. For example, one spouse may wish to view a list of transactions in chronological order, while the other spouse may wish to see the transactions grouped by merchant, or geographic location of the transaction, or by other categories.

As part of interacting with the shared resource allocation structure, the members of the couple may provide answers to a series of questions aimed at ascertaining their respective financial goals. Based on these responses, one or more transaction rules may be developed, either externally, by a third party, or internally, by the couple. In addition to responses to questions, other information may be used to identify and ascertain potential transaction rules. For example, data associated with each individual's financial activities prior to engaging in the joint ownership of a resource, or other individualized activity can be used. In other examples, information about life events obtained from transaction information, social media information, public records, other publicly available information, and/or information otherwise provided by one or more individuals may be used as bases for the development of transaction rules. For example, if the couple shares an interest in saving a larger percentage of their income, they might institute a rule that meals purchased during the work day should be limited to a certain dollar amount when possible, and/or that the expenditures associated with the hobbies of the individuals in the couple should be limited to a certain amount per month. These rules can then be applied to the transactions displayed to the respective spouses, and expenditures that are inconsistent with the rules can be identified to the spouses. In some situations, an individual within the couple or the couple as a whole may opt to challenge each other or accept a challenge issued by a third party, such as a financial institution, to take steps to more closely align their transactions with their financial goals. For example, if the couple is attempting to limit expenditures on hobby-related purchases, the individuals in the couple may be challenged to attempt to limit their expenditures below a certain threshold. Rewards may be offered in connection with a challenge, such as a coupon for a discount at an individual's favored restaurant and/or merchant, or other such rewards.

Consequently, the embodiments of the invention claimed and otherwise described herein are directed to solutions that assist individuals within a couple to implement shared resource allocation structures, visualize activity within such structures, and implement rules associated with their respective financial goals.

FIG. 1 illustrates a system environment 200, for use in connection with the implementation of one or more shared resource allocation structures in accordance with one embodiment of the present invention. FIG. 1 provides the system environment 200 for which example instances the elements and/or processes described herein may be implemented. FIG. 1 provides a unique system that includes specialized servers and system communicably linked across a distributive network that may allow a user, via a user's mobile device, to communicate with systems and servers associated with one or more entities and institutions associated with a shared resource allocation structure and/or the processes described and disclosed herein. The system environment 200 may also provide for the authorization and authentication of a user. The system, with its communicably linked diffusible network may, in some embodiments, improve a general computing device if utilized thereon by improving the ability for the computer device to access and securely transmit and/or present information associated with a shared resource allocation structure, particularly with respect to the modeling thereof. Furthermore, in some embodiments, the system may be, as described below, run on a diffusion network of specialized nodes meant for implementing a shared resource allocation structure.

As illustrated in FIG. 1, the financial institution server 208 is operatively coupled, via a network 201 to the user system 204, and to the network system 206. In this way, the financial institution server 208 can send information to and receive information from the user system 204 and the network system 206 to implement a shared resource allocation structure upon user device authentication. FIG. 2 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual consumer that is associated with a shared resource allocation structure. In some embodiments, the user 202 may interact with a shared resource allocation structure using a user system 204.

FIG. 1 also illustrates a user system 204. The user system 204 generally comprises a communication device 212, a processing device 214, and a memory device 216. The user system 204 is a computing system that allows a user 202 to interact with the financial institution to visualize a shared resource allocation structure and implement changes thereto. The processing device 214 is operatively coupled to the communication device 212 and the memory device 216. The processing device 214 uses the communication device 212 to communicate with the network 201 and other devices on the network 201, such as, but not limited to the network system 206 and the financial institution server 208. As such, the communication device 212 generally comprises a modem, server, or other device for communicating with other devices on the network 201.

The user system 204 comprises computer-readable instructions 220 and data storage 218 stored in the memory device 216, which in one embodiment includes the computer-readable instructions 220 of a user application 222. In this way, a user 202 may interact and change parameters associated with a shared resource allocation structure using the user system 204 via an application operating on the user system 204. Furthermore, the user application 222 may receive a token from the financial institution server 208 or network system 206 and be stored on the memory device 216 of the user system 204. The user system 204 via the user application 222 may decrypt the token to access information required to interact with a shared resource allocation structure. The user system 204 may be, for example, a desktop personal computer, a mobile system, such as a cellular phone, smart phone, personal data assistant (PDA), laptop, or the like.

As further illustrated in FIG. 1, second user 262 and second user system 264 are present in the system environment 200. It will be appreciated that many of the embodiments disclosed and discussed herein contemplate two individuals (for example, married individuals) who jointly hold one or more assets. It will also be appreciated that aspects of the user 202 and the user system 204 are applicable to second user 262 and second user system 264 even though the detailed aspects of the user system 204 have not, for the sake of clarity, been reproduced in connection with second user system 264.

As further illustrated in FIG. 1, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the network system 206 and the user system 204. As such, the communication device 246 generally comprises a modem, server, or other device for communicating with other devices on the network 201.

As further illustrated in FIG. 1, the financial institution server 208 comprises computer-readable instructions 254 stored in the memory device 250, which in one embodiment includes the computer-readable instructions 254 of a financial institution application 258. In some embodiments, the memory device 250 includes data storage 252 for storing data related to the system environment, but not limited to data created and/or used by the financial institution application 258.

In the embodiment illustrated in FIG. 1 and described throughout much of this specification, the financial institution application 258 may allow for implementations of a shared resource allocation structure, contact user system 204 for security confidence, and/or push a token to user system 204 for storage and decryption on user system 204 for use in connection with implementing aspects of a shared resource allocation structure.

In some embodiments, the financial institution application 258 may allow for approval for access to a shared resource allocation structure. In some embodiments, the financial institution application 258 may receive a request to access a shared resource allocation structure via the network 201 from the user 202 via the user system 204 and/or from the second user 262 via the second user system 264. The financial institution application 258 may approve the request after the request is submitted based on a stored standardized request acceptance criteria stored in the memory 250. In some embodiments, this approval by the financial institution application 258 may be instantaneous upon receiving the request.

In some embodiments, the financial institution application 258 may present approval to an online application associated with the user 202. As such, once the financial institution application 258 has approved the request from user 202 to access a shared resource allocation structure, the financial institution application 258 may provide information about accessing and authorizing the use of resources within the structure. The financial institution application 258 may provide this information via an online banking interface associated with the financial institution server 208 and the user's accounts at the financial institution. As such, the financial institution application 258 may provide the user 202 with the information via communication over the network 201 via data feeds to the user system 204. Once the user 202 is authenticated into an online application platform, the financial institution application 258 may provide information about accessing and authorizing the use of a shared resource instantaneously.

In some embodiments, the financial institution application 258 may receive other information about the user 202, such as transaction information and/or information posted by the user 202 on publicly available sources, or from sources that the user 202 has specifically authorized the one or more institutions to view. As such, the financial institution application 258 may receive network data feeds or communications from the user 202 via a user system 204 over the network 201.

In some embodiments, the financial institution application 258 may determine the unique identity of the user system 204 and/or other devices associated with the request to access a shared resource allocation structure and contact the devices for security confidence. In some embodiments, the financial institution application 258 may communicate with the user system 204 and/or other systems to identify the user system 204 and/or the user 202. The financial institution application 258 may then initiate a security check on the devices. The security check generates a security confidence rating to confirm that the device requesting to access a shared resource allocation structure is a device associated with the user and is not corrupted with viruses, malware, or the like. As such, the financial institution application 258 communicates and provides codes for download on the user system 204 that maybe encrypted and subsequently decrypted by the user system 204 for system monitoring and malware searching. As such, the security check and subsequently generated security confidence rating ensures that misappropriation of a shared resource cannot occur. As such, the security check may, in some embodiments, provide code and/or access information about the requesting device, based on the identifier of each device. The financial institution application 258 may confirm the operating system of the device, the health of the device, and determine an IP address or location match between the devices the user uses to log into online banking applications and the requesting device. In some embodiments, the financial institution application 258 may generate a security confidence rating based on the security check that rates the security of authorizing the access to a shared resource allocation structure.

As illustrated in FIG. 1, the network system 206 is connected to the financial institution server 208 and may be associated with an individual or group of individuals qualified to verify and identity and/or a signature or signed document associated with the user 202. In this way, while only one network system 206 is illustrated in FIG. 1, it is understood that multiple network systems may make up the system environment 200. The network system 206 generally comprises a communication device 236, a processing device 238, and a memory device 240. The network system 206 comprises computer-readable instructions 242 stored in the memory device 240, which in one embodiment includes the computer-readable instructions 242 of a network application 244.

In the embodiment illustrated in FIG. 1, the network application 244 provides, in some embodiments, token creation and distribution. In some embodiments the network application 244 may create and distribute a token for storage on the user system 204 and financial institution server 208. The token may include code therein that includes authorization information associated with a shared resource allocation system. As such, the token may be stored in the memory 216 of the user system 204 and subsequently decrypted to be used by the user system 204 as an indicator of the identity and authority of the user 202 to access a shared resource allocation structure. The token may also be stored and decrypted by the financial institution system 208 for reconciliation and processing of a request from the user 202 to change a parameter of a shared resource allocation structure.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a high-level process flow illustrating the implementation of a process 10 to implement a shared resource allocation structure. As depicted in block 102, process 10 comprises receiving a set of transaction information associated with the shared resource allocation structure. In most example implementations of block 102, the transaction information comprises data extracted from a plurality of consumption transactions, namely, transactions that cause resources to in the shared resource allocation structure to be paid out or used. The data extracted from any given consumption transaction may comprise any data associated with a transaction, including but not limited to the amount, time, date, location, merchant name, products or services purchased, and/or other details of the transaction. In some implementations of block 102, the data may include digital images of checks, receipts, invoices, and/or bills, and data extracted from such images.

As depicted in block 104, process 10 further comprises associating a first subset of transaction information with a first user and associating a second subset of transaction information with a second user. In some implementations of block 104, the second subset of transaction information is mutually exclusive from the first subset of transaction information. In such example implementations, the first subset of transaction information may be information associated with the first user, such as transactions made by or on behalf of the first user. Similarly, the second subset of transaction information may be information associated with the second user, such as transactions made by or on behalf of the second user. In implementations where the first subset and the second subset are mutually exclusive, the first user is unable to see the subset of transaction information associated with the second user, and vice versa. In some such implementations, maintaining the mutual exclusivity between the two subsets is may be helpful to the users by focusing the users on transactions that they themselves are associated with, while having the other transactions filtered way and not displayed. This may further be desired in situations where users elect a particular configuration of a display of the transaction information, such as a configuration of a display on the user's mobile device. It will be appreciated that any of a number of approaches can be used in determining how the subsets of transaction information should be populated and associated with a user. For example, digital images of checks, receipts, invoices, bills, or other transaction documents, and data extracted from such images, may be used to associate a transaction with one user or another. As another example, transaction geography (namely, the location where a transaction occurs) may be more closely associated with one user as opposed to another. In another example, such as instances where the holders of a joint account have plastic cards associated with themselves and the joint account, information about which card was used and the holder of the particular card may be used to obtain transaction information and/or associate a transaction with a particular user.

As depicted in block 106, process 10 comprises associating a third subset of transaction information with the first user and with the second user, wherein the third subset of transaction information is mutually exclusive from the first subset of transaction information and is mutually exclusive from the second subset of transaction information. In some such implementations, the third subset of transaction information may comprise transactions that are performed for the benefit of both users collectively. For example, transactions related to housing, food, health, and transportation costs may be included in the third subset of transaction information. In some such implementations, this third subset may be displayed to both the first user and the second user, such that there is still a degree of exclusivity between the displays (the first subset is mutually exclusive from the second subset) but both users can nonetheless both view information pertaining to a subset of transactions, including, for example, transactions that benefit both users.

In some example implementations of processes similar to process 10, the development of transaction rules based on commonalities between the respective financial goals of the users is contemplated. For example, the first user and the second user may be sent a series of questions that can be answered via an interface on their respective user devices. These questions may be designed to elicit responses that allow for a determination of a user's financial goals, plans, beliefs, and/or aims. The responses from the first user and the second user can subsequently be received and processed to extract data from the responses related to the user's respective financial goals.

As such, in some example implementations, the responses receive from the users can be used to identify an area of commonality between the plurality of financial goals of the first user and the plurality of financial goals of the second user. In some situations, there may be substantial overlap between the financial goals of users, suggesting general agreement on financial issues amongst the users, while in other situations, there may be few areas of commonality, suggesting a divergence between the users of financial goals. Some users may find it beneficial to view a depiction of their answers and/or areas of commonality. In example implementations addressing such a situation, it is possible to present to the first user a first depiction of the area of commonality; present to the second user a second depiction of the area of commonality; and establish a transaction rule associated with the commonality. A transaction rule can be any articulable rule that can be applied to transaction or group of transactions. For example, a limitation on the amount of an expenditure at a particular merchant may be a transaction rule. As another example, a limitation on the amount of a class or category of expenditures (such as restaurant meals, particular foods, hobby-related expenses, etc.) over a given period of time may be a transaction rule. In addition to using responses to questions posed to the users, other data may be used in the development and identification of commonalities and transaction rules. For example, transaction trends associated with the individual users (developed prior to the commencement of the use of the shared resource allocation structure, after the commencement of use, and/or both) may be used to identify an individual user's preferences, tendencies, and/or goals. Information associated with life events of one or more users may also be used, such as information about a change in relationship status, family size, living arrangements, or other life events. In some such examples, information obtained from public records, social media, other information provided by the users, and/or other information available to an institution associated with the shared resource allocation structure may be used to identify the occurrence of a life event, user financial goal, or other user preference.

As depicted in block 108, process 10 comprises determining whether a consumption transaction in the first subset of transaction information is inconsistent with the transaction rule and determining whether a consumption transaction in the second subset of transaction information is inconsistent with the transaction rule. In some example implementations of block 108, determining whether a given consumption transaction violates a rule may comprises comparing individual transaction amounts against an applicable rule. In other example situations, additional analysis of any additional data associated with the consumption transactions may be extracted and processed to identify additional details that will permit the categorization, aggregation, and/or other combination of consumption transaction data for purposes of comparison against a transaction rule.

As depicted in block 110, process 10 comprises presenting to the first user a first depiction of the consumption transaction in the first subset of transaction information that is inconsistent with the transaction rule; and presenting to the second user a depiction of the consumption transaction in the second subset of transaction information that is inconsistent with the transaction rule. As discussed above, both the first user and second user may be able to individually configure the appearance of a display on their respective mobile devices of information related to the shared resource allocation structure, including the appearance of transactions that appear to be inconsistent with transaction rules associated with the shared resource allocation structure. For example, one user may choose to view such transactions in chronological order, while another user may prefer to view the transactions grouped in any of a number of categories, such as transaction type, location, products or services purchased, or other such information.

In some situations, it is possible to encourage the users to engage in transactions that adhere to the transaction rules and/or avoid transactions that are inconsistent with the transaction rules through the use of a challenge issued to the users. In some example implementations, this involves transmitting to the first user a challenge associated with the consumption transaction in the first subset of transaction information that violates the rule; and transmitting to the second user a challenge associated with the consumption transaction in the second subset of transaction information that violates the rule. Those skilled in the art will appreciate that the challenge may take any form, such as a challenge to reduce overall expenditures, reduce particular types of expenditures, or engage in transactions or other expenditures at a different frequency. In some situations, a reward may be associated with the challenge, such as a discount to a favored merchant or restaurant, or any other type of reward that is likely to incentivize the users to limit transactions that are inconsistent with transaction rules.

As part of interacting with and visualizing a shared resource allocation structure, users may decide that it would be beneficial to talk to a third party, such as a financial advisor, or one or more individuals who are similarly situated to the users and may be able to provide guidance or other information regarding the shared resource allocation structure, rules associated therewith, or other aspects of the shared resource allocation structure. Consequently, in some example implementations, a first communication channel between a user device associated with the first user and a user device associated with a third user is established. A second communication channel between a user device associated with the second user and the user device associated with the third user may also be established. In some such implementations, communication between the first or second user and the third user may be private, such that a communication between the first user and the third user (or between the second user and the third user) is not available to the other user. In some implementations, communications from all users will be available to all users, such that the first and second user can communicate with each other and the third user simultaneously. In some implementations, the third user will be unaffiliated with first user and will be unaffiliated with the second user. In some such implementations, the third user may be considered by the first user and the second user to be neutral, objective party capable of providing reliable advice.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 14/851,750 (now published as U.S. patent application publication No. 2017/0076378) | SYSTEM FOR RESTRUCTURING BASED ON PREDICTIVE ANALYSIS | Concurrently Herewith |
| 14/851,758 (now published as U.S. patent application publication No. 2017/0076366) | UNIVERSAL TOKENIZATION SYSTEM | Concurrently Herewith |
| 14/851,599 (now published as U.S. patent application publication No. 2017/0076283) | SYSTEM FOR MODELING AND IMPLEMENTING EVENT-RESPONSIVE RESOURCE ALLOCATION STRUCTURES | Concurrently Herewith |

-continued

| U.S. patent application Ser. No. | Title | Filed On |
| --- | --- | --- |
| 14/851,623 (now published as U.S. patent application publication No. 2017/0076364) | SYSTEM FOR SIMULATION AND IMPLEMENTATION OF DYNAMIC STATE-DEPENDENT RESOURCE RECONFIGURATION | Concurrently Herewith |
| 14/851,765 (now published as U.S. patent application publication No. 2017/0076379) | SYSTEM FOR ANALYZING PRE-EVENT AND POST-EVENT INDIVIDUAL ACCOUNTS AND TRANSFORMING THE ACCOUNTS | Concurrently Herewith |
| 14/851,769 (now published as U.S. patent application publication No. 2017/0076271) | SYSTEM FOR OPENING AND CONSOLIDATING ACCOUNTS BASED ON AN EVENT ASSOCIATED WITH THE ACCOUNT HOLDER | Concurrently Herewith |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for dynamic visualization of individualized consumption across a shared resource allocation structure, the system comprising:
a memory device with non-transitory computer-readable program code stored thereon;
a communication device;
a processing device operatively coupled to the memory device and the communication device within a distributive network, wherein the processing device is configured to execute the computer-readable program code to:
establish a first communication channel with a first user device associated with a first user;
receive, from the first user device, a first request from the first user to access the shared resource allocation structure, wherein receiving the first request further comprises receiving one or more authentication credentials associated with the first user;
validate the one or more authentication credentials associated with the first user;
receive a set of transaction information associated with the shared resource allocation structure, wherein the transaction information comprises data extracted from a plurality of consumption transactions;
determine a first subset of transaction information from the transaction information received from the shared resource allocation structure based on at least validating the one or more authentication credentials associated with the first user, wherein the first subset of transaction information relates to one or more transactions performed by the first user;

associate the first subset of transaction information with the first user;

determine a unique identity of the first user device;

perform a security check of the first user device by (1) determining, based on the unique identity of the first user device, that the first user device is associated with the first user and (2) determining that the first user device is not corrupted with viruses or malware;

display, via the first user device, the first subset of transaction information to the first user based on at least performing the security check of the first user device;

establish a second communication channel with a second user device associated with a second user;

receive, from the second user device, a second request from the second user to access the shared resource allocation structure, wherein receiving the second request further comprises receiving one or more authentication credentials associated with the second user;

validate the one or more authentication credentials associated with the second user;

determine a second subset of transaction information from the transaction information received from the shared resource allocation structure based on at least validating the one or more authentication credentials associated with the second user, wherein the second subset of transaction information relates to one or more transactions performed by the second user;

associate the second subset of transaction information with the second user;

determine a unique identity of the second user device;

perform a security check of the second user device by (1) determining, based on the unique identity of the second user device, that the second user device is associated with the second user and (2) determining that the second user device is not corrupted with viruses or malware;

filter the second subset of transaction information in a manner that requires the second subset of transaction information to be mutually exclusive from the first subset of transaction information; and display, via the second user device, the second subset of transaction information based on at least performing the security check of the second user device.

2. The system of claim 1 wherein the processing device is further configured to execute the computer readable program code to:

associate a third subset of transaction information with the first user and with the second user, wherein the third subset of transaction information is mutually exclusive from the first subset of transaction information and is mutually exclusive from the second subset of transaction information.

3. The system of claim 2, wherein the processing device is further configured to execute the computer-readable program code to:

receive from the first user a first plurality of responses to questions, wherein the first plurality of responses is associated with a plurality of financial goals of the first user; and receive from the second user a second plurality of responses to questions, wherein the second plurality of responses is associated with a plurality of financial goals of the second user.

4. The system of claim 3, wherein the processing device is further configured to execute the computer-readable program code to:

identify an area of commonality between the plurality of financial goals of the first user and the plurality of financial goals of the second user;

present to the first user a first depiction of the area of commonality;

present to the second user a second depiction of the area of commonality; and establish a transaction rule associated with the commonality.

5. The system of claim 4 wherein the processing device is further configured to execute the computer readable program code to:

determine whether a consumption transaction in the first subset of transaction information is inconsistent with the transaction rule;

determine whether a consumption transaction in the second subset of transaction information is inconsistent with the transaction rule;

present to the first user a first depiction of the consumption transaction in the first subset of transaction information that is inconsistent with the transaction rule; and present to the second user a depiction of the consumption transaction in the second subset of transaction information that is inconsistent with the transaction rule.

6. The system of claim 5, wherein the processing device is further configured to execute the computer-readable program code to:

transmit to the first user a challenge associated with the consumption transaction in the first subset of transaction information that violates the rule; and transmit to the second user a challenge associated with the consumption transaction in the second subset of transaction information that violates the rule.

7. The system of claim 6, wherein the processing device is further configured to execute the computer-readable program code to:

establish a third communication channel between the first user device and a communication device associated with a third-party;

establish a fourth communication channel between the second user device and the communication device associated with the third party; and establish a fifth communication channel between the first user device, the second user device, and the communication device associated with the third-party.

8. A computer program product for implementing dynamic visualization of individualized consumption across a shared resource allocation structure, the computer program product comprising at least one non-transitory computer-readable medium having computer-readable program code embodied therein, the computer-readable program code when executed by a processing device is configured to cause the processing device to:

establish a first communication channel with a first user device associated with a first user;

receive, from the first user device, a first request from the first user to access the shared resource allocation structure, wherein receiving the first request further comprises receiving one or more authentication credentials associated with the first user;

validate the one or more authentication credentials associated with the first user;

receive a set of transaction information associated with the shared resource allocation structure, wherein the transaction information comprises data extracted from a plurality of consumption transactions;

determine a first subset of transaction information from the transaction information received from the shared resource allocation structure based on at least validating the one or more authentication credentials associated with the first user, wherein the first subset of transaction information relates to one or more transactions performed by the first user;

associate the first subset of transaction information with the first user;

determine a unique identity of the first user device;

perform a security check of the first user device by (1) determining, based on the unique identity of the first user device, that the first user device is associated with the first user and (2) determining that the first user device is not corrupted with viruses or malware;

display, via the first user device, the first subset of transaction information to the first user based on at least performing the security check of the first user device;

establish a second communication channel with a second user device associated with a second user;

receive, from the second user device, a second request from the second user to access the shared resource allocation structure, wherein receiving the second request further comprises receiving one or more authentication credentials associated with the second user;

validate the one or more authentication credentials associated with the second user;

determine a second subset of transaction information from the transaction information received from the shared resource allocation structure based on at least validating the one or more authentication credentials associated with the second user, wherein the second subset of transaction information relates to one or more transactions performed by the second user;

associate the second subset of transaction information with the second user;

determine a unique identity of the second user device;

perform a security check of the second user device by (1) determining, based on the unique identity of the second user device, that the second user device is associated with the second user and (2) determining that the second user device is not corrupted with viruses or malware;

filter the second subset of transaction information in a manner that requires the second subset of transaction information to be mutually exclusive from the first subset of transaction information; and display, via the second user device, the second subset of transaction information based on at least performing the security check of the second user device.

9. The computer program product of claim 8 wherein the computer readable program code when executed by the processing device is configured to cause the processing device to:

associate a third subset of transaction information with the first user and with the second user, wherein the third subset of transaction information is mutually exclusive from the first subset of transaction information and is mutually exclusive from the second subset of transaction information.

10. The computer program product of claim 9, wherein the computer-readable program code when executed by the processing device is configured to cause the processing device to:

receive from the first user a first plurality of responses to questions, wherein the first plurality of responses is associated with a plurality of financial goals of the first user; and receive from the second user a second plurality of responses to questions, wherein the second plurality of responses is associated with a plurality of financial goals of the second user.

11. The computer program product of claim 10, wherein the computer-readable program code when executed by the processing device is configured to cause the processing device to:

identify an area of commonality between the plurality of financial goals of the first user and the plurality of financial goals of the second user;

present to the first user a first depiction of the area of commonality;

present to the second user a second depiction of the area of commonality; and establish a transaction rule associated with the commonality.

12. The computer program product of claim 11 wherein the computer readable program code when executed by the processing device is configured to cause the processing device to:

determine whether a consumption transaction in the first subset of transaction information is inconsistent with the transaction rule;

determine whether a consumption transaction in the second subset of transaction information is inconsistent with the transaction rule;

present to the first user a first depiction of the consumption transaction in the first subset of transaction information that is inconsistent with the transaction rule; and present to the second user a depiction of the consumption transaction in the second subset of transaction information that is inconsistent with the transaction rule.

13. The computer program product of claim 12, wherein the computer-readable program code when executed by the processing device is configured to cause the processing device to:

transmit to the first user a challenge associated with the consumption transaction in the first subset of transaction information that violates the rule; and transmit to the second user a challenge associated with the consumption transaction in the second subset of transaction information that violates the rule.

14. The computer program product of claim 13, wherein the computer-readable program code when executed by the processing device is configured to cause the processing device to:

establish a third communication channel between the first user device and a communication device associated with a third-party;

establish a fourth communication channel between the second user device and the communication device associated with the third party; and establish a fifth communication channel between the first user device, the second user device, and the communication device associated with the third-party.

15. A method for implementing dynamic visualization of individualized consumption across a shared resource allocation structure, the method comprising:

establishing a first communication channel with a first user device associated with a first user;

receiving, from the first user device, a first request from the first user to access the shared resource allocation structure, wherein receiving the first request further comprises receiving one or more authentication credentials associated with the first user;
validating the one or more authentication credentials associated with the first user;
receiving a set of transaction information associated with the shared resource allocation structure, wherein the transaction information comprises data extracted from a plurality of consumption transactions;
determining a first subset of transaction information from the transaction information received from the shared resource allocation structure based on at least validating the one or more authentication credentials associated with the first user, wherein the first subset of transaction information relates to one or more transactions performed by the first user;
associating the first subset of transaction information with the first user;
determining a unique identity of the first user device;
performing a security check of the first user device by (1) determining, based on the unique identity of the first user device, that the first user device is associated with the first user and (2) determining that the first user device is not corrupted with viruses or malware;
displaying, via the first user device, the first subset of transaction information to the first user based on at least performing the security check of the first user device;
establishing a second communication channel with a second user device associated with a second user;
receiving, from the second user device, a second request from the second user to access the shared resource allocation structure, wherein receiving the second request further comprises receiving one or more authentication credentials associated with the second user;
validating the one or more authentication credentials associated with the second user;
determining a second subset of transaction information from the transaction information received from the shared resource allocation structure based on at least validating the one or more authentication credentials associated with the second user, wherein the second subset of transaction information relates to one or more transactions performed by the second user;
associating the second subset of transaction information with the second user;
determining a unique identity of the second user device;
performing a security check of the second user device by (1) determining, based on the unique identity of the second user device, that the second user device is associated with the second user and (2) determining that the second user device is not corrupted with viruses or malware;
filtering the second subset of transaction information in a manner that requires the second subset of transaction information to be mutually exclusive from the first subset of transaction information; and
displaying, via the second user device, the second subset of transaction information based on at least performing the security check of the second user device.

16. The method of claim 15 wherein the method further comprises:
associating a third subset of transaction information with the first user and with the second user, wherein the third subset of transaction information is mutually exclusive from the first subset of transaction information and is mutually exclusive from the second subset of transaction information.

17. The method of claim 16, wherein the method further comprises:
receiving from the first user a first plurality of responses to questions, wherein the first plurality of responses is associated with a plurality of financial goals of the first user; and
receiving from the second user a second plurality of responses to questions, wherein the second plurality of responses is associated with a plurality of financial goals of the second user.

18. The method of claim 17, wherein the method further comprises:
identifying an area of commonality between the plurality of financial goals of the first user and the plurality of financial goals of the second user;
presenting to the first user a first depiction of the area of commonality;
presenting to the second user a second depiction of the area of commonality;
establishing a transaction rule associated with the commonality;
determining whether a consumption transaction in the first subset of transaction information is inconsistent with the transaction rule;
determining whether a consumption transaction in the second subset of transaction information is inconsistent with the transaction rule;
presenting to the first user a first depiction of the consumption transaction in the first subset of transaction information that is inconsistent with the transaction rule; and
presenting to the second user a depiction of the consumption transaction in the second subset of transaction information that is inconsistent with the transaction rule.

19. The method of claim 18, wherein the method further comprises:
transmitting to the first user a challenge associated with the consumption transaction in the first subset of transaction information that violates the rule; and
transmitting to the second user a challenge associated with the consumption transaction in the second subset of transaction information that violates the rule.

20. The method of claim 19, wherein the method further comprises:
establishing a third communication channel between the first user device and a communication device associated with a third-party;
establishing a fourth communication channel between the second user device and the communication device associated with the third party; and
establishing a fifth communication channel between the first user device, the second user device, and the communication device associated with the third-party.

* * * * *